UNITED STATES PATENT OFFICE.

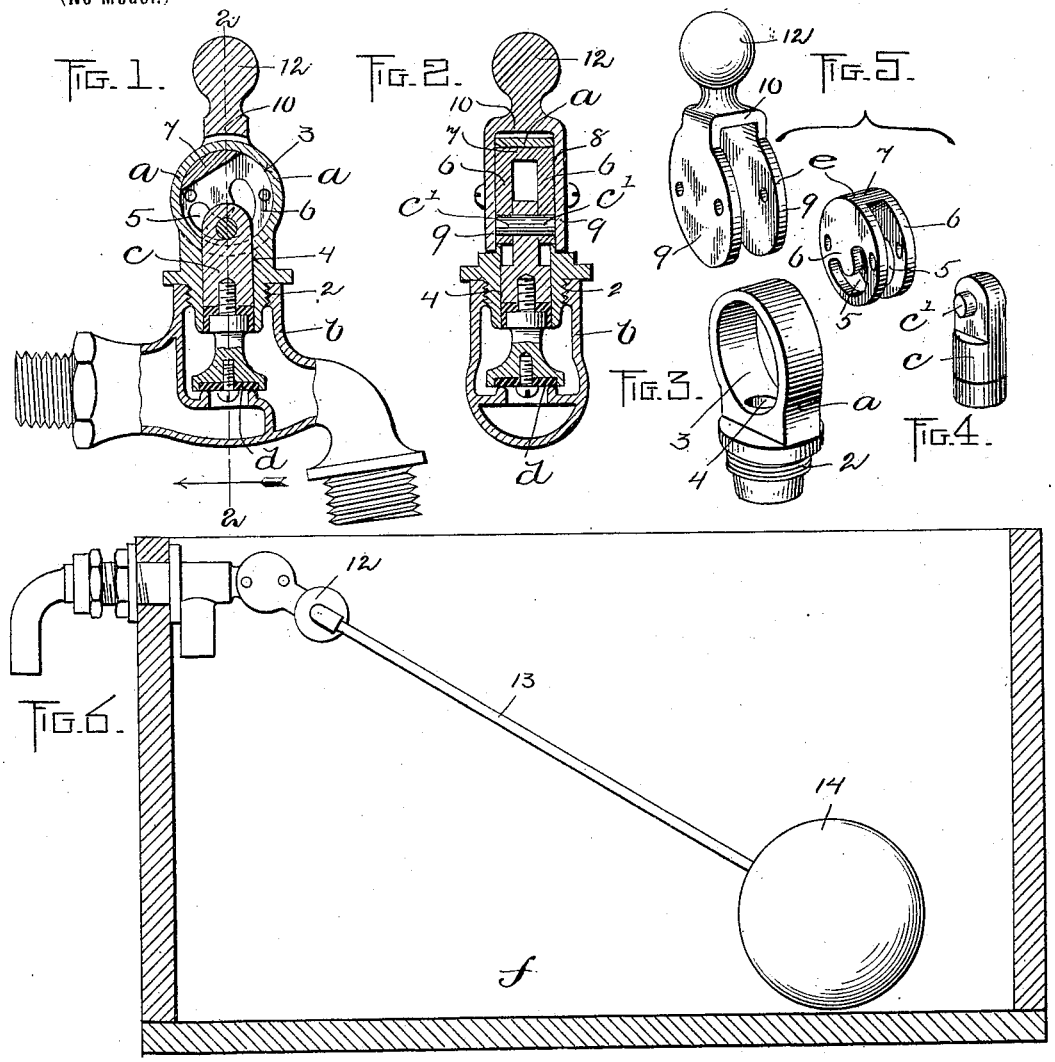

GEORGE T. WILSON, OF SOMERVILLE, MASSACHUSETTS, ASSIGNOR OF THREE-FOURTHS TO JULIAN D'ESTE, OF SALEM, AND EDWARD WEBB, OF READING, MASSACHUSETTS.

FAUCET.

SPECIFICATION forming part of Letters Patent No. 615,939, dated December 13, 1898.

Application filed January 15, 1898. Serial No. 666,810. (No model.)

*To all whom it may concern:*

Be it known that I, GEORGE T. WILSON, of Somerville, in the county of Middlesex and State of Massachusetts, have invented certain new and useful Improvements in Valve-Operating Devices for Faucets, &c., of which the following is a specification.

This invention has for its object to provide simple and effective means for giving a quick movement to a valve located in a casing which is provided with a valve-seat, the casing being, for example, that of a faucet or other equivalent appliance adapted to discharge liquid from a suitable source of supply.

The invention consists of the improvements which I will now proceed to describe and claim.

Of the accompanying drawings, forming a part of this specification, Figure 1 represents a sectional elevation of a faucet embodying my invention. Fig. 2 represents a section on line 2 2 of Fig. 1. Figs. 3, 4, and 5 represent in separate views the parts of my improved valve-operating device. Fig. 6 represents a side elevation showing a ball-cock provided with my invention. Fig. 7 represents a sectional view of the cock shown in Fig. 6. Fig. 8 represents a sectional view of a faucet, showing my improved operating device adapted only for opening the valve, the latter being closed by a spring.

The same letters and numerals of reference indicate the same parts in all the figures.

In the drawings, *a* represents a bonnet which is provided at or near one end with an external screw-thread 2, adapted to engage an internal thread in a casing *b*. In Figs. 1, 2, and 8 I show the casing as of suitable form for a faucet, while in Figs. 6 and 7 the casing forms part of a ball-cock. The bonnet *a* is provided in its outer end with a cylindrical bearing 3. A guide 4 for a valve-stem extends from said bearing to the inner end of the bonnet and opens into the interior of the casing *b*.

*c* represents a stem adapted to be connected with the valve *d*, said stem being formed to fit and move endwise in the guide 4, its outer end projecting into the bearing 3.

A sectional head *e* is fitted to rotate in the bearing 3, the head having provisions for converting its own rotary motion into an endwise movement of the valve-stem. In the construction shown in Figs. 1 to 7, inclusive, the head is constructed to positively move the valve-stem in both directions—that is, toward and from its seat—the said provisions consisting of curved slots 5 5, formed in the body portion of the head or that portion which is contained in the bearing 3, the head being composed of separable sections, one of which is composed of two disks 6 6, connected by a neck 7 and having between them a recess 8, formed to receive the outer portion of the valve-stem, while the other section is composed of two plates 9 9 of greater diameter than the disks 6 6 and formed to bear upon the ends of the bearing 3 and cover the joint between the bearing and the disks 6 6, as shown in Fig. 2. The plates 9 9 are preferably connected by a neck 10, which extends across the upper portion of the bonnet at the exterior thereof and is provided with an operating-lever 12. The plates 9 9 are detachably connected to the disks 6 6 by means of screws or other suitable fastening devices.

The valve-stem *c* is provided with oppositely-projecting studs or trunnions *c' c'*, formed to enter the slots 5 5, and said slots are so formed that a partial rotation of the head *e* in one direction will raise the valve *d* from its seat, while a partial rotation in the opposite direction will force the valve against its seat.

The construction shown in Figs. 6 and 7 is substantially the same as that above described, the operating-lever 12 being adapted to be connected with a float-lever 13, having a float 14, contained in a tank or reservoir *f*.

In Fig. 8 the general construction is the same as that already described; but in this case the head *e* is used to move the valve-stem in one direction only—namely, away from its seat—the valve being automatically seated by a spring *s*. In this case the disks 6 6 of the head *e* are provided with radially-arranged slots 15, which receive studs or projections on the valve-stem, said studs being preferably provided with loose blocks 16, which fit and are movable in the slots 15.

It will be seen that in each of the modifications of my invention above described the head fitted to turn in a bearing in the bonnet and provided with an external operating-lever and with valve-stem-engaging slots enables the valve-stem to be operated quickly and with the minimum frictional resistance. The sectional construction of the head enables the parts to be readily assembled and separated, and the enlargement of the end portions of the head—namely, the disks 9 9—so that they cover the joint between the body portion of the head and the bearing, prevents liability of leakage of liquid through said joint.

Having thus explained the nature of my invention and described a way of constructing and using the same, although without having attempted to set forth all the forms in which it may be embodied or all the modes of its use, I declare that what I claim is—

1. A valve-operating device of the character specified, comprising a bonnet having means for attachment to a casing or support and provided in its outer portion with a cylindrical bearing and with a stem-guide extending from the bearing to the inner end of the bonnet, a valve-stem closely fitting said guide and projecting into the bearing, and a head fitted to turn in said bearing and having provisions within the bearing for imparting endwise movement to the stem, and an external operating-lever.

2. A valve-operating device of the character specified, comprising a bonnet having means for attachment to a casing or support and provided in its outer portion with a cylindrical bearing and with a stem-guide extending from the bearing to the inner end of the bonnet, a valve-stem fitted to move endwise in said guide and projecting into the bearing, a sectional head composed of a cylindrical body fitted to turn in the bearing and having provisions for imparting endwise movement to the valve-stem, plates formed to cover the ends of the joint between the said body portion and the bearing, and an external operating-lever, the sections of the head being detachably connected to permit the removal of the head from the bonnet.

In testimony whereof I have affixed my signature in presence of two witnesses.

GEORGE T. WILSON.

Witnesses:
C. F. BROWN,
A. D. HARRISON.